(12) United States Patent
Rajaa et al.

(10) Patent No.: US 10,152,415 B1
(45) Date of Patent: Dec. 11, 2018

(54) TECHNIQUES FOR BACKING UP APPLICATION-CONSISTENT DATA USING ASYNCHRONOUS REPLICATION

(75) Inventors: Subash Rajaa, Pune (IN); Ashish L. Gawali, Pune (IN)

(73) Assignee: Veritas Technologies LLC, Mountain View ( * ) Notice: Subject to any disclaimer, the term of this patent is extended or adjusted under 35 U.S.C. 154(b) by 813 days.

(21) Appl. No.: 13/176,004

(22) Filed: Jul. 5, 2011

(51) Int. Cl.
G06F 12/00 (2006.01)
G06F 12/0804 (2016.01)
G06F 11/14 (2006.01)
G06F 11/20 (2006.01)

(52) U.S. Cl.
CPC ...... *G06F 12/0804* (2013.01); *G06F 11/1451* (2013.01); *G06F 11/1461* (2013.01); *G06F 11/1466* (2013.01); *G06F 11/2069* (2013.01)

(58) Field of Classification Search
CPC ............. G06F 11/1461; G06F 11/1451; G06F 11/2069; G06F 11/1466
See application file for complete search history.

(56) References Cited

U.S. PATENT DOCUMENTS

| | | | | |
|---|---|---|---|---|
| 6,360,306 B1 * | 3/2002 | Bergsten | | 711/162 |
| 7,752,403 B1 * | 7/2010 | Weinman, Jr. | | 711/162 |
| 8,972,353 B1 * | 3/2015 | Sharma | G06F 17/30088 | 707/640 |
| 2005/0004979 A1 * | 1/2005 | Berkowitz et al. | | 709/203 |
| 2005/0198327 A1 * | 9/2005 | Iwamura et al. | | 709/229 |
| 2006/0123210 A1 * | 6/2006 | Pritchett | G06F 11/1466 | 711/162 |
| 2010/0011178 A1 * | 1/2010 | Feathergill | | 711/162 |
| 2011/0099148 A1 * | 4/2011 | Bruning, III | | 707/639 |
| 2012/0203742 A1 * | 8/2012 | Goodman | G06F 11/1469 | 707/646 |
| 2012/0233123 A1 * | 9/2012 | Shisheng et al. | | 707/639 |
| 2012/0311575 A1 * | 12/2012 | Song | | 718/1 |

OTHER PUBLICATIONS

Veritas Cluster Server User's Guide 5.0, Symantec Corporation, 2006, p. 1-700.*

* cited by examiner

*Primary Examiner* — Arvind Talukdar
(74) *Attorney, Agent, or Firm* — Patent Law Works LLP (57) ABSTRACT

Techniques for backing up application-consistent data using asynchronous replication are disclosed. In one particular embodiment, the techniques may be realized as a method for backing up application-consistent data comprising receiving a backup request to backup application data and storing the application data in a volume of storage space. The method may also comprise taking a snapshot of the application data stored in the volume of storage space and quiescing, via a quiescing module comprising at least one computer processor, the snapshot of the application data stored in the volume of storage space. The method further comprise transmitting application-consistent data, wherein the application-consistent data may comprise the application data stored in the volume of storage space and the quiesced snapshot of the application data stored in the volume of storage space.

15 Claims, 5 Drawing Sheets

TECHNIQUES FOR BACKING UP APPLICATION-CONSISTENT DATA USING ASYNCHRONOUS REPLICATION

FIELD OF THE DISCLOSURE

The present disclosure relates generally to backing up data using asynchronous replication and, more particularly, to techniques for backing up application-consistent data using asynchronous replication.

BACKGROUND OF THE DISCLOSURE

Data replication is a process of sharing information so as to ensure consistency between redundant resources, such as software or hardware components. Replicated data may be stored on multiple storage devices, for example, a primary site and a secondary site. Asynchronous data replication may increase performance of a data backup system. However, in the event of a primary site crash, the secondary site is not guaranteed to have the most recent replicated data. During asynchronous data replication, a secondary site may be updated with crash consistent data from a primary site. However, some applications at the primary site may not recover from crash-consistent data. Thus, merely replicating crash-consistent data and storing the replicated crash-consistent data may not be sufficient to recover applications at the primary site after a crash event.

In view of the foregoing, it may be understood that there may be significant problems and shortcomings associated with current techniques for backing up data using asynchronous replication.

SUMMARY OF THE DISCLOSURE

Techniques for backing up application-consistent data using asynchronous replication are disclosed. In one particular embodiment, the techniques may be realized as a method for backing up application-consistent data comprising receiving a backup request to backup application data and storing the application data in a volume of storage space. The method may also comprise taking a snapshot of the application data stored in the volume of storage space and quiescing, via a quiescing module comprising at least one computer processor, the snapshot of the application data stored in the volume of storage space. The method further comprise transmitting application-consistent data, wherein the application-consistent data may comprise the application data stored in the volume of storage space and the quiesced snapshot of the application data stored in the volume of storage space.

In accordance with still another aspect of this particular embodiment, receiving a backup request may comprise automatically generating the backup request.

In accordance with yet another aspect of this particular embodiment, storing the application data in a volume of storage space may comprise dividing the volume of storage space into a plurality of logical volume partitions.

In accordance with additional aspects of this particular embodiment, the application data may be stored in at least one of the plurality of logical volume partitions.

In accordance with further aspects of this particular embodiment, the snapshot of the application data stored in the volume of storage space may be a state of the application data stored in the volume of storage space at a particular time.

In accordance with other aspects of this particular embodiment, quiescing the snapshot of the application data stored in the volume of storage space may comprise associating a volume of data change object (DCO) with the snapshot of the application data stored in the volume of storage space.

In accordance with still another aspect of this particular embodiment, the volume of data change object may enable a dirty region logging (DRL) to facilitate recovery after a crash event.

In accordance with yet another aspect of this particular embodiment, the dirty region logging may track changes to the application data stored in the volume of storage space since taking the snapshot of the application data stored in the volume of storage space due to operations performed to the application data stored in the volume of storage space.

In accordance with additional aspects of this particular embodiment, quiescing the snapshot of the application data stored in the volume of storage space may comprise flushing one or more pending operations in a buffer.

In accordance with further aspects of this particular embodiment, the application-consistent data may be transmitted via asynchronous replication.

In accordance with other aspects of this particular embodiment, the method may further comprise receiving an acknowledgement message from a second site.

In accordance with still another aspect of this particular embodiment, the method may further comprise deleting the snapshot of the application data stored in the volume of storage space in response to receiving the acknowledgement message from the second site.

In another particular embodiment, the technique(s) may be realized as a system for backing up application-consistent data comprising a user interface module configured to receive a backup request to backup application data and a data volume managing module comprising at least one database configured to store the application data in a volume of storage space. The system may also comprise a volume snapshot module configured to take a snapshot of the application data stored in the volume of storage space and a quiescing module comprising at least one computer processor configured to quiesce the snapshot of the application data stored in the volume of storage space. The system may further comprise a communication module configured to transmit application-consistent data, wherein the application-consistent data may comprise the application data stored in the volume of storage space and the quiesced snapshot of the application data stored in the volume of storage space.

In accordance with still another aspect of this particular embodiment, the data volume managing module may be further configured to divide the volume of storage spaces into a plurality of logical volume partitions.

In accordance with yet another aspect of this particular embodiment, the data volume managing module may be configured to store the application data in at least one of the plurality of logical volume partitions.

In accordance with additional aspects of this particular embodiment, the snapshot of the application data stored in the volume of storage space may be a state of the application data stored in the volume of storage space at a particular time.

In accordance with further aspects of this particular embodiment, the quiescing module may be further configured to associate a volume of data change object (DCO) with the snapshot of the application data stored in the volume of storage space.

In accordance with other aspects of this particular embodiment, the quiescing module may be further configured to flush one or more pending operations in a buffer.

In accordance with still another aspect of this particular embodiment, the communication module may be configured to transmit the application-consistent data via asynchronous replication.

In another particular embodiment, the technique(s) may be realized as a method for retrieving backed up application-consistent data comprising receiving, via a communication module, a volume of application-consistent data, wherein the volume of application-consistent data may comprise application data associated with the one or more applications and an quiesced snapshot of the application data. The method may also comprise taking, via a volume snapshot module comprising at least one computer processor, a snapshot of the volume of application-consistent data and mounting, via a data managing module, the snapshot of the volume of application-consistent data.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
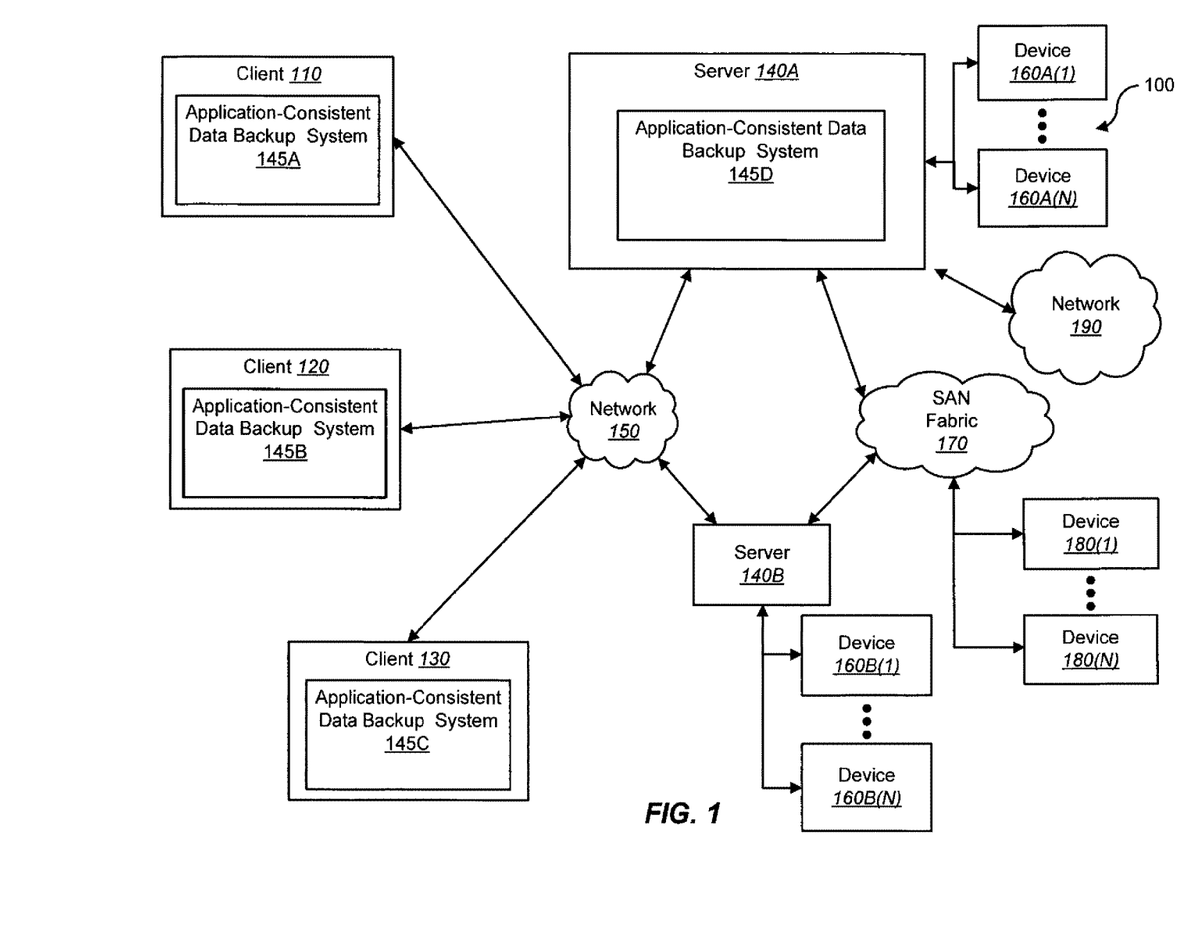
FIG. 1 shows a block diagram depicting a network architecture for backing up application-consistent data using asynchronous replication in accordance with an embodiment of the present disclosure.

FIG. 1 shows a block diagram depicting a network architecture 100 for backing up application-consistent data using asynchronous replication in accordance with an embodiment of the present disclosure. FIG. 1 is a simplified view of network architecture 100, which may include additional elements that are not depicted. Network architecture 100 may contain clients 110-130 and servers 140A-140B (one or more of which may be implemented using computer system 200 shown in FIG. 2). Clients 110-130 may be communicatively coupled to a network 150. Server 140A may be communicatively coupled to networks 190 and 150. Server 140B may be communicatively coupled to storage devices 160A(1)-(N). Server 140B may be communicatively coupled to a SAN (Storage Area Network) fabric 170. SAN fabric 170 may support access to storage devices 180(1)-(N) by server 140B, and by clients 110-130 via network 150.

The description below describes network elements, computers, and/or components of a system and method for backing up application-consistent data using asynchronous replication that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are illustrative. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Servers 140A and 140B may be communicatively coupled to a SAN (Storage Area Network) fabric 170. SAN fabric 170 may support access to storage devices 180(1)-(N) by servers 140A-140B and by clients 110-130 via network 150. Server 140A may be communicatively coupled to network 190. According to some embodiments, server 140A may be a proxy server, a datacenter, and/or other network device capable of storing data. Server 140A may comprise an application-consistent data backup system 145D. The application-consistent data backup system 145D may backup application-consistent data in order to recover applications during a crash event.

Figure 2:
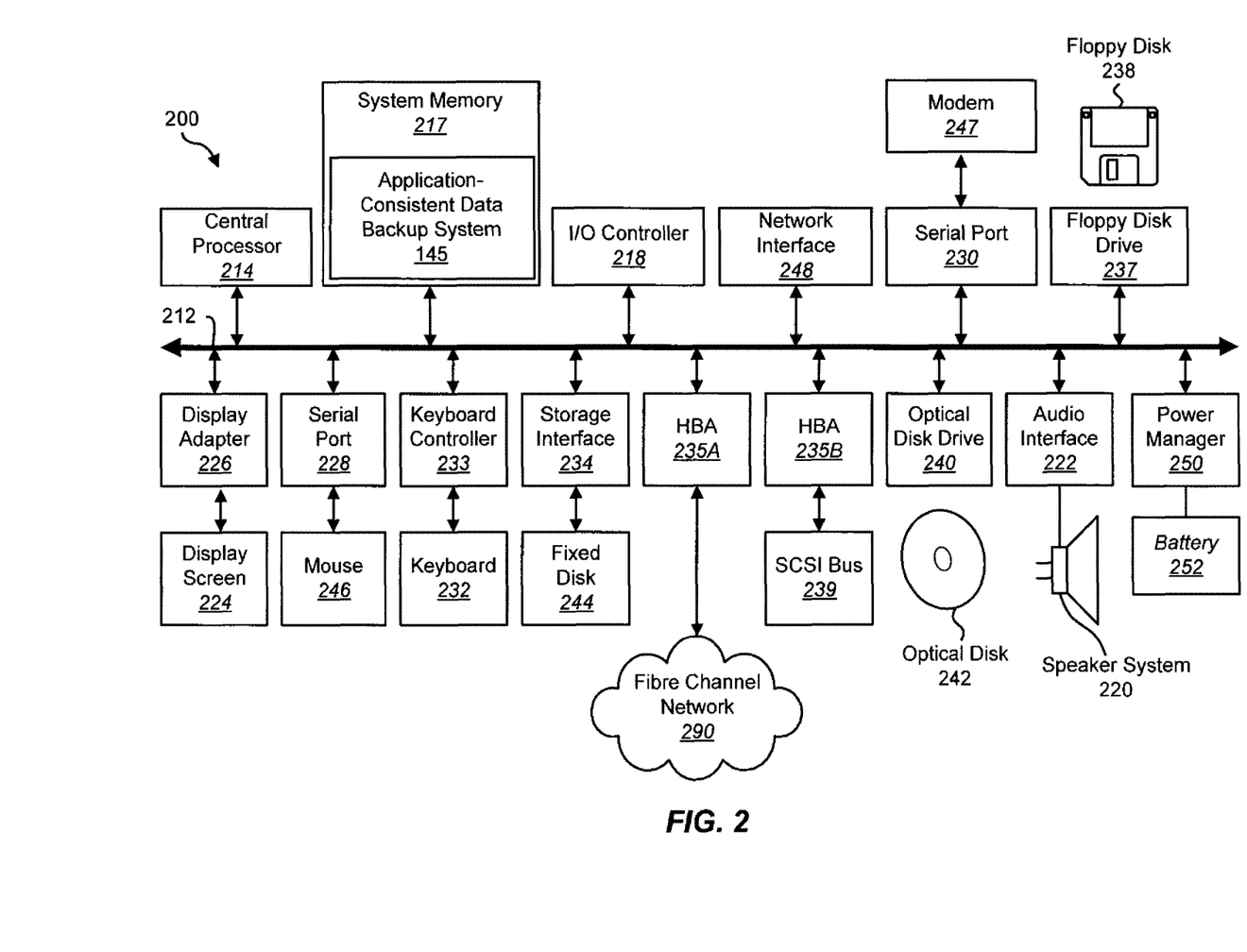
FIG. 2 depicts a block diagram of a computer system in accordance with an embodiment of the present disclosure.

With reference to computer system 200 of FIG. 2, modem 247, network interface 248, or some other method may be used to provide connectivity from of clients 110-130 to network 150. Clients 110-130 may be able to access information on servers 140A-140B using, for example, a web browser or other client software. Such a client may allow clients 110-130 to access data hosted by servers 140A-140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110-130, servers 140A-140B, and other devices communicatively coupled to networks 150 and 190. Networks 150 and 190 may further include one, or any number, of the illustrative types of networks mentioned above operating as a stand-alone network or in cooperation with each other. Networks 150 and 190 may utilize one or more protocols of one or more clients 110-130 and/or servers 140A-140B to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to servers 140A-140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110-130 may be a smartphone, PDA, desktop computer, a laptop computer, a server, another computer, or another device coupled via a wireless or wired connection to network 150. Clients 110-130 may receive data from user input, a database, a file, a web service, an application programming interface, and/or a graphical user interface. According to some embodiments, clients 110-130 may be a mobile client such as, for example, a smart phone.

Servers 140A-140B may be application servers, archival platforms, backup servers, network storage devices, media servers, email servers, document management platforms, enterprise search servers, enterprise management servers, or other devices communicatively coupled to network 150. Servers 140A-140B may utilize one of storage devices 160A(1)-(N), 160B(1)-(N), and/or 180(1)-(N) for the storage of application data, backup data, or other data. Servers 140A-140B may be hosts, such as an application server, which may process data traveling between clients 110-130 and a backup platform, a backup process, and/or storage. According to some embodiments, servers 140A-140B may be platforms used for backing up and/or archiving data.

According to some embodiments, the application-consistent data backup systems 145A-D may reside on one or more primary sites and/or one or more secondary sites. In a particular embodiment, the primary sites may be clients 110-130 and the secondary sites may be servers 140A-140B. In another embodiment, the primary sites may be servers 140A-140B and the secondary sites may be clients 110-130. It may be appreciated by one of skilled in the art that the primary sites and the secondary sites are designations of difference locations for hosting the application-consistent data backup systems 145A-D.

The application-consistent data backup systems 145A-C hosted by the primary sites (e.g., clients 110-130) may be communicatively coupled to the application-consistent data backup system 145D hosted by the secondary sites (e.g., server 145D). The application-consistent data backup systems 145A-C residing on one or more primary sites (e.g., clients 110-130) may manage a volume of application data. For example, the application-consistent data backup system 145 may divide a volume of storage space at the primary site into a plurality of logical volume partitions. The application-consistent data backup system 145 may store or mount application data to at least one of the plurality of logical volume partitions. The application-consistent data backup system 145 may take a snapshot of the volume of application data. The snapshot of the volume of application data may be a state of the volume of application data at a primary site (e.g., clients 110-130) at a particular point in time. The application-consistent data backup system 145 may mount or store the snapshot of the volume of application data in a logical volume partition of the plurality of logical volume partitions.

The application-consistent data backup system 145 may process the snapshot of the volume of application data before transmitting the snapshot of the volume of application data to one or more secondary site (e.g., servers 140A-140B). For example, the application-consistent data backup system 145 may quiesce the snapshot of the volume of application data. In a particular embodiment, quiescing the snapshot of the volume of application data may comprise pausing or altering a state of the one or more pending or running processes or operations at the primary site (e.g., clients 110-130). In another embodiment, quiescing the snapshot of the volume of application data may comprise associating a data change object (DCO) log and/or a data change object volume with the snapshot of the volume of application data. The application-consistent data backup system 145 may transmit application-consistent data to one or more secondary sites (e.g., servers 140A-140B) using asynchronous replication. The application-consistent data may comprise the quiesced snapshot of the volume of application data and/or the volume of application data. The one or more secondary sites (e.g., servers 140A-140B) may mount or store the application consistent data.

After a crash event, a recovery process may be initiated by the application-consistent data backup system 145 located at one or more secondary sites (e.g., servers 140A-140B). For example, the application-consistent data backup system 145 may initiate a fire drill operation at the one or more secondary sites (e.g., servers 140A-140B). For the fire drill operation, the application-consistent data backup system 145 may take a snapshot of the application-consistent data (e.g., the quiesced snapshot of the volume of application data and/or the volume of application data) stored or mounted (or a target of asynchronous replication) at the one or more secondary sites (e.g., servers 140A-140B). In a particular embodiment, the application-consistent data backup system 145 may take a snapshot of the application-consistent data stored or mounted at the one or more secondary sites (e.g., servers 140A-140B) at a hardware array level. The application-consistent data backup system 145 may provide the snapshot of the application consistent data stored or mounted at the one or more secondary sites (e.g., servers 140A-140B) to one or more primary sites (e.g., clients 110-130) to recover one or more applications at the one or more primary sites.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, application-consistent data backup system 145 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an Internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in a non-transitory computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
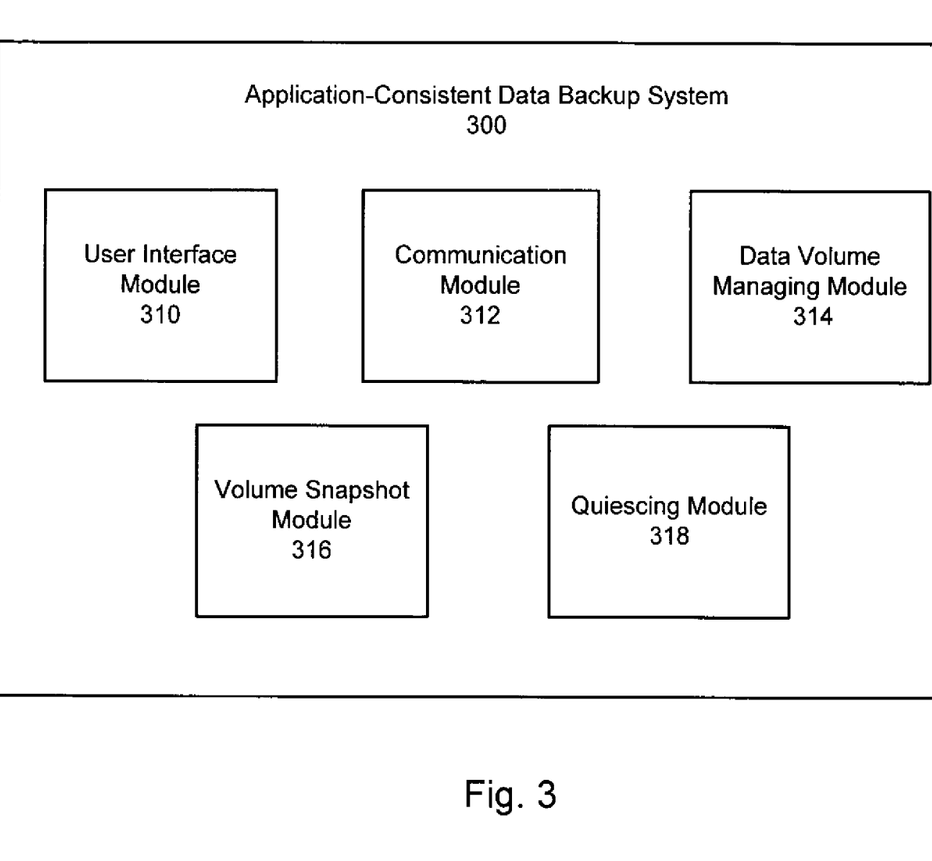
FIG. 3 shows an application-consistent data backup system in accordance with an embodiment of the present disclosure.

Referring to FIG. 3, there is shown an application-consistent data backup system 300 in accordance with an embodiment of the present disclosure. As illustrated, the application-consistent data backup system 300 may contain one or more components or modules including a user interface module 310, a communication module 312, a data volume managing module 314, a volume snapshot module 316, and/or a quiescing module 318.

The user interface module 310 may provide an interface between users associated with the clients 110-130 and the application-consistent data backup system 300. The user interface module 310 may include a user interface, e.g., a graphical user interface, to receive one or more queries/requests from the user associated with the clients 110-130. The user interface module 310 may provide a separate or a unified graphical user interface. The user interface module 310 may also include an Application Programming Interface (API) to interact with the clients 110-130 and/or servers 140A-140B. In a particular embodiment, the user interface module 310 may present one or more graphical contents or displays to the user associated with the clients 110-130 and/or server 140A.

The user interface module 310 may receive one or more queries/requests for login to the application-consistent data backup system 300. The user interface module 310 may authenticate a user to login to the application-consistent data backup system 300. The user interface module 310 may implement a single sign-on (SSO) access control for the application-consistent data backup system 300. In a particular embodiment, the user interface module 310 may receive user identification and/or user password to sign-on to the application-consistent data backup system 300. The user interface module 310 may authenticate the received user identification and/or user password to login the user to the application-consistent data backup system 300.

The user interface module 310 may automatically generate one or more backup queries/requests to backup application data from one or more primary sites (e.g., clients 110-130). For example, the user interface module 310 may automatically generate one or more backup queries/requests to backup application data from one or more primary sites at predetermined time interval (e.g., a second, a minute, a hour, a day, a month, a year). In a particular embodiment, the user interface module 310 may automatically generate one or more backup queries/requests to backup application data from one or more primary sites every minute.

The user interface module 310 may receive one or more queries/requests from users to backup application data from one or more primary sites (e.g., clients 110-130). The user interface module 310 may receive one or more queries/requests from users to initiate an application recovery process from one or more secondary sites (e.g., servers 140A-140B). The user interface module 310 may also automatically generate one or more queries/requests to backup application data and/or initiate an application recovery process. For example, the user interface module 310 may receive a backup request from a user to backup application-consistent data (e.g., a volume of application data and/or a quiesced snapshot of the volume of application data) from one or more primary sites (e.g., clients 110-130). In another embodiment, the user interface module 310 may receive a recovery request from a user to initiate a recovery process from application-consisted data stored in one or more secondary sites (e.g., servers 140A-140B). In response to receiving the one or more queries/requests from a user, the user interface module 310 may provide the one or more queries/requests to the communication module 312, the data volume managing module 314, the volume snapshot module 316, and/or the quiescing module 318. For example, in response to receiving the one or more backup requests and/or recovery requests from the user, the user interface module 310 may provide the one or more backup requests and/or recovery requests to the communication module 312, the data volume managing module 314, the volume snapshot module 316, and/or the quiescing module 318.

The data volume managing module 314 may comprise at least one computer processor and/or a database for managing and storing application data of the application-consistent data backup system 300. In a particular embodiment, the data volume managing module 314 may implement a Veritas Volume Manager (VxVM) to manage a volume of data storage at the primary sites (e.g., clients 110-130) and/or the secondary sites (e.g., servers 140A-140B). The data volume managing module 314 may divide a volume of data storage at the primary sites (e.g., clients 110-130) or the secondary sites (e.g., servers 140A-140B) into a plurality logical volume partitions. In a particular embodiment, the data volume managing module 314 may divide a volume of data storage of sixty gigabytes (GBs) into three logical volume partitions of twenty gigabytes (GBs).

The data volume managing module 314 may assign each logical volume partitions for storing different data. For example, the data volume managing module 314 may assign a first logical volume partition to store or mount application data at the primary sites (e.g., clients 110-130) and/or the secondary sites (e.g., servers 140A-140B). For example, the data volume managing module 314 may store or mount the application data into a first logical volume partition. The data volume managing module 314 may assign a second logical volume partition to store or mount a snapshot of the volume of application data at the primary sites (e.g., clients 110-130). The snapshot of the volume of application data may be a state of the first logical volume partition storing the application data at a particular point in time. In another embodiment, the data volume managing module 314 may assign a second logical volume partition to store or mount a quiesced snapshot of the volume of application data at the secondary sites (e.g., servers 140A-140B).

The volume snapshot module 316 may comprise at least one computer processor to create a copy or a snapshot of a volume of application data. In a particular embodiment, the volume snapshot module 316 may be a volume snapshot service provider that may take a snapshot of a volume of application data. The volume snapshot module 316 may take a snapshot of one or more blocks of a volume of application data. For example, the volume snapshot module 316 may periodically (e.g., every second, minute, hour, day, month, or year) take a snapshot of a volume of application data. In a particular embodiment, the volume snapshot module 316 may take a snapshot of a volume of application data every ten seconds.

The volume snapshot module 316 may discard or delete a snapshot of a volume of application data after a predetermined period of time. In a particular embodiment, the volume snapshot module 316 may discard or delete an outdated snapshot of a volume of application data when an updated snapshot of a volume of application data is taken. In another embodiment, the volume snapshot module 316 at the primary sites may discard or delete a snapshot of a volume of application data after the secondary sites (e.g., servers 140A-140B) acknowledges that the snapshot of a volume of application data is transmitted to the secondary sites.

The volume snapshot module 316 located at the secondary sites (e.g., servers 140A-140B) may initiate a fire drill operation at the one or more secondary sites (e.g., servers 140A-140B) to recover applications at the primary sites (e.g., clients 110-130). For the fire drill operation, the volume snapshot module 316 may take a snapshot of the application-consistent data (e.g., the quiesced snapshot of the volume of application data and/or the volume of application data) stored or mounted at the secondary sites (e.g., servers 140A-140B). In a particular embodiment, the volume snapshot module 316 may take a snapshot of the application-consistent data stored or mounted at the secondary sites (e.g., servers 140A-140B) at a hardware array level. The volume snapshot module 316 may provide the snapshot of the application consistent data stored or mounted at the secondary sites (e.g., servers 140A-140B) to the primary sites (e.g., clients 110-130) to recover applications at the primary sites.

The quiescing module 318 may comprise at least one computer processor for processing the snapshot of a volume of application data. For example, the quiescing module 318 may pause or alter one or more pending operations at the primary sites (e.g., clients 110-130) that may modify the stored volume of application data. The quiescing module 318 may flush one or more pending operations in a buffer (e.g., data storage that may store temporary data that are in the process of transferring). In a particular embodiment, the quiescing module 318 may flush a pending write operation in the buffer at the primary sites (e.g., clients 110-130).

The quiescing module 318 may associate a volume of recovery data with the snapshot of a volume of application data. In a particular embodiment, the quiescing module 318 may implement a vxsnap command to associate a volume of recovery data with the snapshot of a volume of application data. The quiescing module 318 may associate a volume of data change object (DCO) with the snapshot of a volume of application data. The volume of data change object (DCO) may allow dirty region logging (DRL) to enable speedy recovery after a crash event. For example, the dirty region logging (DRL) may track changes to a volume of application data since taking the snapshot of a volume of application data due to pending operations performed to a volume of application data. The quiescing module 318 may periodically (e.g., every second, minute, hour, day, month, or year) associate a volume of recovery data with the snapshot of a volume of application data. In a particular embodiment, the quiescing module 318 may associate a volume of recovery data with the snapshot of a volume of application data every ten seconds.

The communication module 312 may comprise at least one computer processor and/or transceiver device to transmit or receive information between the primary sites (e.g., clients 110-130) and the secondary sites (e.g., servers 140A-140B). The communication module 312 may transmit and/or receive information between the primary sites and the secondary sites via an asynchronous replication. For example, the communication module may transmit and/or receive application-consistent data (e.g., the volume of application data and/or the quiesced snapshot of the volume of application data) between the primary sites and the secondary sites via an asynchronous replication. For asynchronous replication, the primary sites may continue to perform various operations without having to wait for the application-consistent data to transmit to the secondary sites.

The communication module 312 may monitor when application-consistent data (e.g., the volume of application data and/or the quiesced snapshot of the volume of application data) are ready to be transmitted from the primary sites (e.g., clients 110-130) to the secondary sites (e.g., servers 140A-140B). The communication module 312 at the primary sites (e.g., clients 110-130) may provide a tag associated with the quiesced snapshot of the volume of application data. The communication module 312 at the primary sites (e.g., clients 110-130) may update a tag associated with the quiesced snapshot of the volume of application data when the quiesced snapshot of the volume of application date is updated.

The communication module 312 at the secondary sites (e.g., servers 140A-140B) may monitor the tag associated with the quiesced snapshot of the volume of application data at the primary sites (e.g., clients 110-130). For example, the communication module 312 at the secondary sites may monitor the tag periodically (e.g., every second, minute, hour, day, month, or year). In a particular embodiment, the communication module 312 at the secondary sites may monitor the tag at the primary sites every five seconds. The communication module 312 may trigger a fire drill operation at the secondary sites in response to detecting an updated tag associated with the quiesced snapshot of the volume of application data at the primary sites.

The communication module 312 at the secondary sites (e.g., servers 140A-140B) may receive application-consistent data from the primary sites (e.g., clients 110-130). For example, the communication module 312 at the secondary sites may receive the application-consistent data from the primary sites and provide the application-consistent data to the data volume managing module 314. The data volume managing module 314 at the secondary sites may mount and store the application-consistent data from the primary sites. The communication module 312 at the secondary sites may provide an acknowledgement message to the communication module 312 at the primary sites that the application-consistent data have been received.

Figure 4:
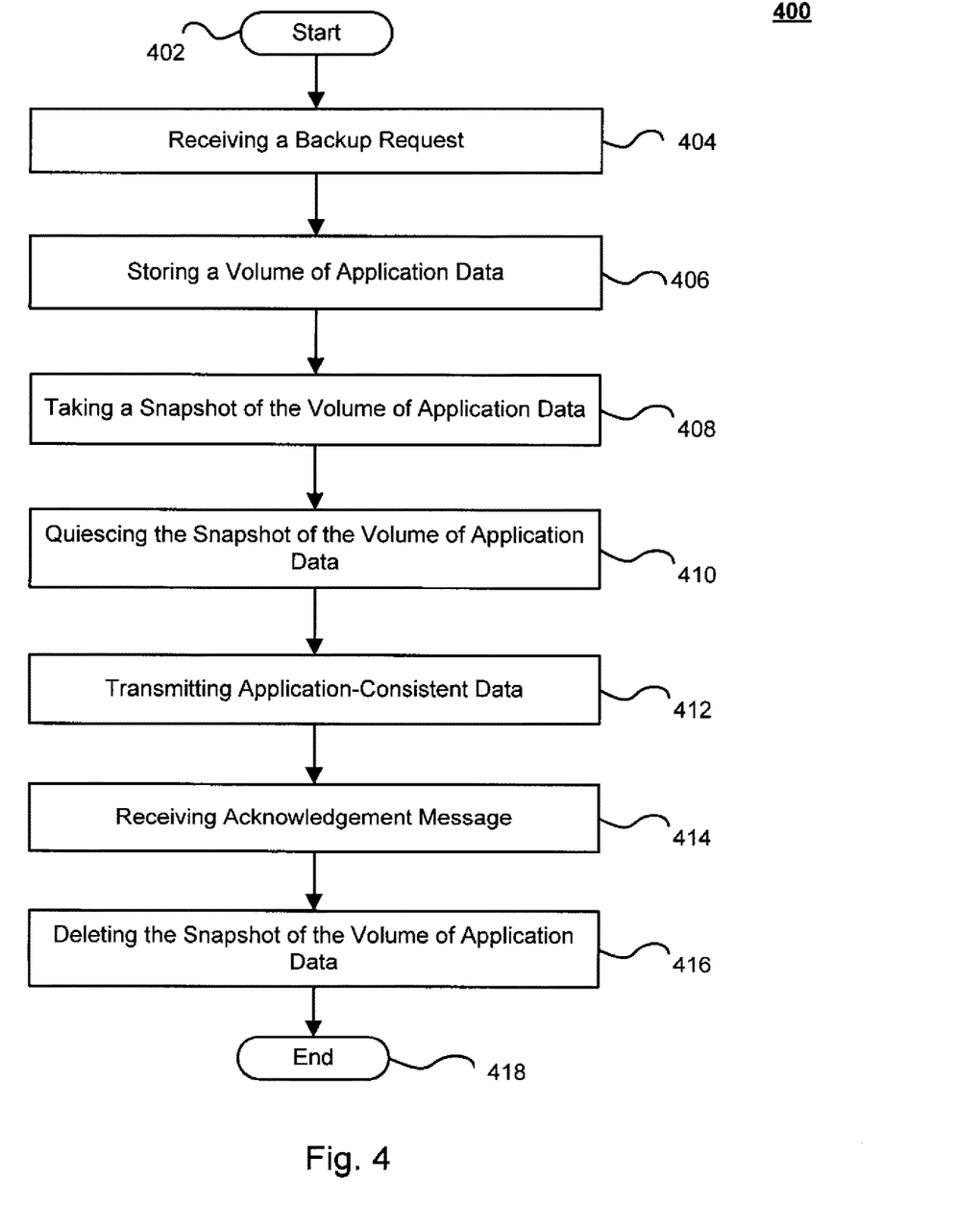
FIG. 4 depicts a method for backing up application-consistent data using asynchronous replication in accordance with an embodiment of the present disclosure.

Referring to FIG. 4, there is depicted a method 400 for backing up application-consistent data using asynchronous replication at a primary site in accordance with an embodiment of the present disclosure. At block 402, the method 400 may begin.

At block 404, a backup request may be received at the user interface module 310. The user interface module 310 may automatically generate one or more backup queries/requests to backup application data at the primary sites (e.g., clients 110-130). For example, the user interface module 310 may automatically generate one or more queries/requests to backup application data from one or more primary sites at predetermined time interval (e.g., a second, a minute, a hour, a day, a month, a year). The one or more backup queries/requests may be manually provided by the user associated with the primary sites (e.g., clients 110-130). For example, the user interface module 310 may receive a backup request from a user to backup application data. In response to receiving the one or more back queries/requests from a user, the user interface module 310 may provide the one or more backup queries/requests to the communication module 312, the data volume managing module 314, the volume snapshot module 316, and/or the quiescing module 318.

At block 406, a volume of application data may be stored. For example, data volume managing module 314 may store or mount application data into a volume of storage space at the primary site (e.g., clients 110-130). The data volume managing module 314 may divide a volume of data storage at the primary sites (e.g., clients 110-130) into a plurality logical volume partitions. The data volume managing module 314 may assign each logical volume partitions for storing different data. For example, the data volume managing module 314 may assign a first logical volume partition to store or mount application data at the primary sites (e.g., clients 110-130). For example, the data volume managing module 314 may store or mount the application data into a first logical volume partition.

At block 408, a snapshot of the volume of application data may be taken. The volume snapshot module 316 may take a copy or snapshot of the volume of application data. In a particular embodiment, the volume snapshot module 316 may take a snapshot of one or more blocks of the volume of application data. In another embodiment, the volume snapshot module 316 may periodically (e.g., every second, minute, hour, day, month, or year) take snapshot of a volume of application data.

At block 410, the snapshot of the volume of application may be quiesced. The quiescing module 318 may associate a volume of recovery data with the snapshot of the volume of application data. In a particular embodiment, the quiescing module 318 may implement a vxsnap command to associate a volume of recovery data with the snapshot of the volume of application data. The quiescing module 318 may associate a volume of data change object (DCO) with the snapshot of a volume of application data. The volume of data change object (DCO) may allow dirty region logging (DRL) to enable speedy recovery after a crash event. For example, the quiescing module 318 may flush one or more pending operations in a buffer (e.g., data storage that may store temporary data that are in the process of transferring). In a particular embodiment, the quiescing module 318 may flush a pending write operation in the buffer at the primary sites (e.g., clients 110-130). The dirty region logging (DRL) may track changes to the volume of application data since taking the snapshot of the volume of application data due to operations performed to the volume of application data. The quiescing module 318 may periodically (e.g., every second, minute, hour, day, month, or year) associate a volume of recovery data with the snapshot of the volume of application data. In a particular embodiment, the quiescing module 318 may associate a volume of recovery data with the snapshot of the volume of application data every ten seconds.

At block 412, the application-consistent data may be transmitted from the primary sites to the secondary sites. The communication module 312 may transmit the application-consistent data (e.g., the volume of application data and the quiesced snapshot of the volume of application data) to one or more secondary sites (e.g., servers 140A-140B). For example, the communication module 31 may transmit the application-consistent data (e.g., the volume of application data and/or the quiesced snapshot of the volume of application data) to the secondary sites via an asynchronous replication. For asynchronous replication, the primary sites may continue to perform various operations without having to wait for the application-consistent data to transmit to the secondary sites.

In another embodiment, the communication module 312 may monitor when application-consistent data (e.g., the volume of application data and/or the quiesced snapshot of the volume of application data) are ready to be transmitted from the primary sites (e.g., clients 110-130) to the secondary sites (e.g., servers 140A-140B). For example, the communication module 312 may provide a tag associated with the quiesced snapshot of the volume of application data. The communication module 312 may update a tag associated with the quiesced snapshot of the volume of application data when the quiesced snapshot of the volume of application date is updated. The communication module 312 may transmit the application-consistent data when the tag is updated.

At block 414, an acknowledgement message may be received. The communication module 312 may receive an acknowledgement message that the application-consistent data was received by the secondary sites. In a particular embodiment, the communication module 312 at the secondary sites may provide an acknowledgement message to the communication module 312 at the primary sites that the application-consistent data have been received.

At block 416, the snapshot of the volume of application data may be deleted. The volume snapshot module 316 may discard or delete a snapshot of a volume of application data after a predetermined period of time. In a particular embodiment, the volume snapshot module 316 may discard or delete the snapshot of a volume of application data in response to the acknowledgement messages that the application-consistent data is transmitted to the secondary sites.

At block 418, the method 400 may end.

Figure 5:
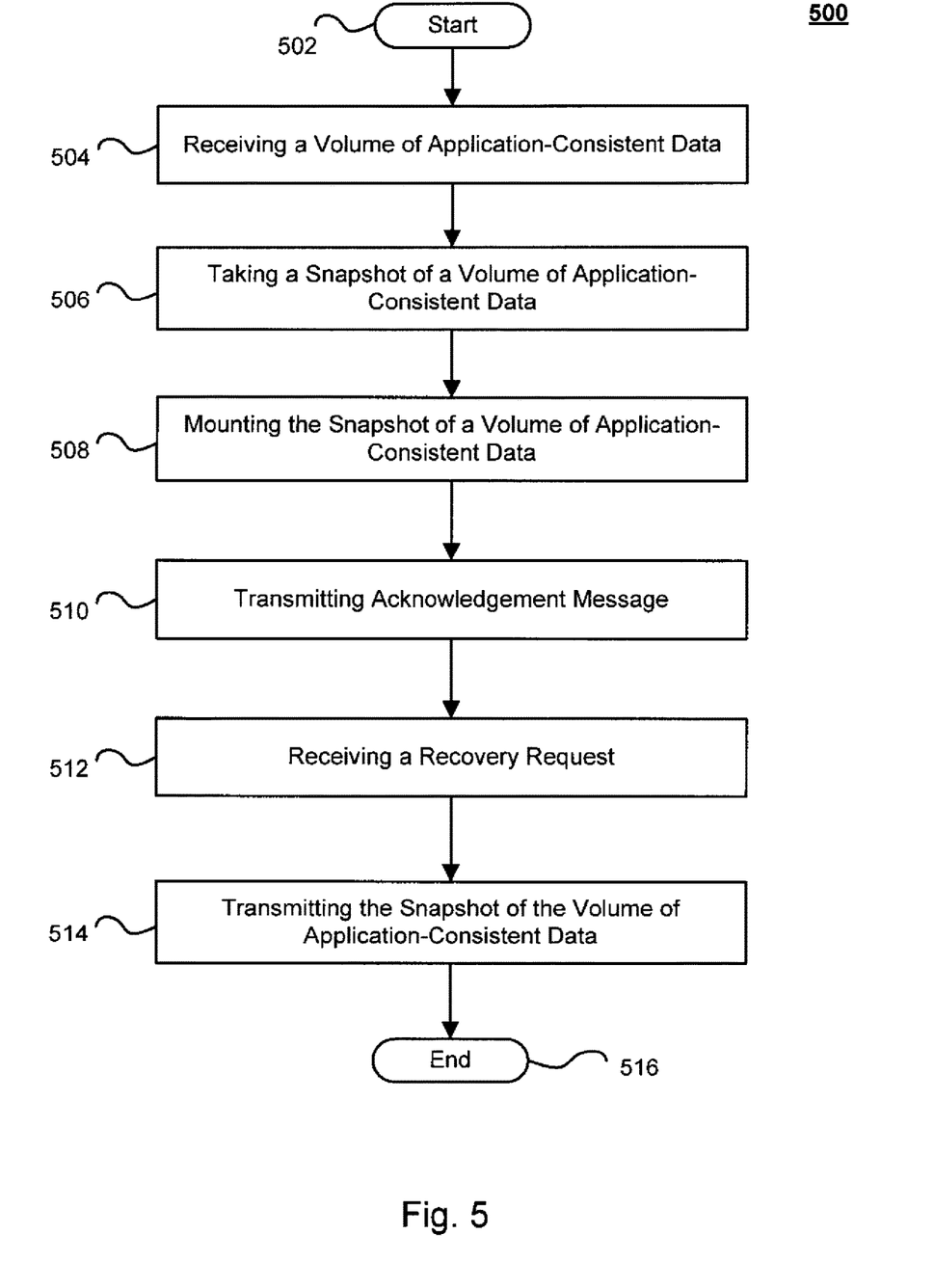
FIG. 5 depicts a method for backing up application-consistent data using asynchronous replication in accordance with an alternate embodiment of the present disclosure.

Referring to FIG. 5, there is depicted a method 500 for backing up application-consistent data using asynchronous replication at a secondary site in accordance with an embodiment of the present disclosure. At block 502, the method 500 may begin.

At block 504, a volume of application-consistent data may be received. For example, the communication module 312 at the secondary site may receive a volume of application-consistent data transmitted by the communication module 312 at the primary site. The application-consistent data received may comprise a volume of application data and the quiesced snapshot of the volume of application data. The communication module 312 may store the volume of application-consistent data in a temporary storage location (e.g., data volume managing module 314).

At block 506, a snapshot of a volume of application-consistent data may be taken. The volume snapshot module 316 at the secondary sites may take a snapshot of a volume of application-consistent data stored at the secondary sites. For example, the volume snapshot module 316 may poll for the arrival of the volume of application-consistent data at the secondary site. The volume snapshot module 316 may induce a firedrill operation at the secondary site to take a snapshot of the volume of application-consistent data based at least in part on an arrival of the volume of application-consistent data at the secondary site.

At block 508, the snapshot of the volume of application-consistent data may be mounted and stored. For example, the data volume managing module 314 may mount the snapshot of the volume of application-consistent data and stored at a volume of storage space at the secondary site.

At block 510, an acknowledgement message may be transmitted. The communication module 312 at the secondary site may transmit an acknowledgement message that the application-consistent data was received and stored. In a particular embodiment, the communication module 312 at the secondary sites may provide an acknowledgement message to the communication module 312 at the primary sites that the application-consistent data have been received.

At block 512, a recovery request may be received. The user interface module 310 at the secondary sites (e.g., servers 140A-140B) may receive a recovery request to recover one or more applications after a crash event. For example, the user interface module 310 may automatically generate a recovery request in response to a crash event. In another embodiment, the user interface module 310 may receive a recovery request from a user to initiate a recovery process from application-consisted data stored in one or more secondary sites (e.g., servers 140A-140B). In response to receiving the one or more recovery queries/requests from a user, the user interface module 310 may provide the one or more queries/requests to the communication module 312, the data volume managing module 314, the volume snapshot module 316, and/or the quiescing module 318.

At block 514, a snapshot of the volume of application-consistent data may be transmitted. The communication module 312 at the secondary sites may transmit the snapshot of the volume of application-consistent data to the primary sites to recover one or more applications at the primary sites.

At block 510, the method 500 may end.

At this point it should be noted that backing up application-consistent data using asynchronous replication in accordance with the present disclosure as described above may involve the processing of input data and the generation of output data to some extent. This input data processing and output data generation may be implemented in hardware or software. For example, specific electronic components may be employed in an application-consistent data backup system or similar or related circuitry for implementing the functions associated with backing up application-consistent data using asynchronous replication in accordance with the present disclosure as described above. Alternatively, one or more processors operating in accordance with instructions may implement the functions associated with backing up application-consistent data using asynchronous replication in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for backing up application-consistent data comprising:
    receiving a backup request to backup application data;
    storing the application data in a volume of storage space at a first site;
    taking a snapshot of the application data stored in the volume of storage space;
    quiescing, via a quiescing module comprising at least one computer processor, the snapshot of the application data stored in the volume of storage space, wherein quiescing the snapshot of the application data stored in the volume of storage space comprises flushing one or more pending operations in a buffer;
    transmitting application-consistent data to a second site via asynchronous replication, wherein the application-consistent data comprises the application data stored in the volume of storage space and the quiesced snapshot of the application data stored in the volume of storage space, wherein the application data and the quiesced snapshot are transmitted together;
polling for an arrival of a volume of the applicant-consistent data at the second site;
taking a snapshot of the volume of the application-consistent data based at least in part on the arrival of the volume of the application-consistent data at the second site;
deleting the quiesced snapshot of the application data stored in the volume of storage space after receiving an acknowledgement message indicating successful transmission of the application-consistent data;
associating a tag with the quiesced snapshot;
monitoring the tag for updates;
triggering a fire drill operation in response to detecting an update to the tag; and
in response to a fire drill operation being triggered, taking a snapshot of the application-consistent data at the second site in order to recover the application data at the first site.

2. The method of claim 1, wherein receiving a backup request comprises automatically generating the backup request.

3. The method of claim 1, wherein storing the application data in a volume of storage space comprises dividing the volume of storage space into a plurality of logical volume partitions.

4. The method of claim 3, wherein the application data is stored in at least one of the plurality of logical volume partitions.

5. The method of claim 1, wherein the snapshot of the application data stored in the volume of storage space is a state of the application data stored in the volume of storage space at a particular time.

6. The method of claim 1, wherein quiescing the snapshot of the application data stored in the volume of storage space comprises associating a volume of data change object (DCO) with the snapshot of the application data stored in the volume of storage space.

7. The method of claim 6, wherein the volume of data change object enables a dirty region logging (DRL) to facilitate recovery after a crash event.

8. The method of claim 7, wherein the dirty region logging tracks changes to the application data stored in the volume of storage space since taking the snapshot of the application data stored in the volume of storage space due to operations performed to the application data stored in the volume of storage space.

9. A system for backing up application-consistent data comprising:
at least one processor configured to execute instructions for:
a user interface module configured to receive a backup request to backup application data;
a data volume managing module comprising at least one database configured to store the application data in a volume of storage space at a first site;
a volume snapshot module configured to take a snapshot of the application data stored in the volume of storage space;
a quiescing module comprising at least one computer processor configured to quiesce the snapshot of the application data stored in the volume of storage space, wherein the quiescing module is further configured to flush one or more pending operations in a buffer;
a communication module configured to transmit application-consistent data to a second site via asynchronous replication, wherein the application-consistent data comprises the application data stored in the volume of storage space and the quiesced snapshot of the application data stored in the volume of storage space, wherein the application data and the quiesced snapshot are transmitted together, wherein the communication module is further configured to poll for an arrival of a volume of the applicant-consistent data at the second site; wherein the communication module is further configured to take a snapshot of the volume of the application-consistent data based at least in part on the arrival of the volume of the application-consistent data at the second site, wherein the communication module is further configured to delete the quiesced snapshot of the application data stored in the volume of storage space after receiving an acknowledgement message indicating successful transmission of the application-consistent data, wherein the communication module is further configured to associate a tag with the quiesced snapshot, wherein the tag is monitored for updates, wherein a fire drill operation is triggered in response to detecting an update to the tag; and
in response to a fire drill operation being triggered, taking a snapshot of the application-consistent data at the second site in order to recover the application data at the first site.

10. The system of claim 9, wherein the data volume managing module is further configured to divide the volume of storage spaces into a plurality of logical volume partitions.

11. The system of claim 10, wherein the data volume managing module is configured to store the application data in at least one of the plurality of logical volume partitions.

12. The system of claim 9, wherein the snapshot of the application data stored in the volume of storage space is a state of the application data stored in the volume of storage space at a particular time.

13. The system of claim 9, wherein the quiescing module is further configured to associate a volume of data change object (DCO) with the snapshot of the application data stored in the volume of storage space.

14. A method for retrieving backed up application-consistent data comprising:
receiving, from a user interface module, via a communication module at a first site, a volume of application-consistent data from a second site, wherein the volume of application-consistent data comprises application data associated with the one or more applications and a quiesced snapshot of the application data, wherein the application data and the quiesced snapshot are transmitted together from the second site via asynchronous replication, wherein the quiesced snapshot is associated with a tag;
sending an acknowledgement message indicating successful transmission such that the quiesced snapshot of the application data stored in the volume of storage space is deleted in response to the acknowledgement message;
polling for an arrival of the volume of the applicant-consistent data;
taking, via a volume snapshot module comprising at least one computer processor, a snapshot of the volume of application-consistent data based at least in part on the arrival of the volume of the application-consistent data;
mounting, via a data managing module, the snapshot of the volume of application-consistent data;
monitoring the tag for updates; and triggering a fire drill operation in response to detecting an update to the tag; and in response to a fire drill operation being triggered, taking a snapshot of the application-consistent data at the second site in order to recover the application data at the first site.

15. The method of claim 1, wherein the snap shot is at a hardware array level.

* * * * *